Jan. 26, 1932.　　　C. C. FARMER　　　1,842,516

EMERGENCY VALVE MECHANISM

Filed Dec. 5, 1929

INVENTOR
CLYDE C. FARMER
BY
ATTORNEY

Patented Jan. 26, 1932

1,842,516

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA

EMERGENCY VALVE MECHANISM

Application filed December 5, 1929. Serial No. 411,751.

This invention relates to a quick action emergency valve mechanism, such as is employed in the well known triple valve device of a fluid pressure brake system.

The emergency valve mechanism as heretofore employed comprises an emergency piston working in a bushing secured in the triple valve body casing and having a hollow stem which is guided in a bearing in a member which is clamped between the triple valve casing and the check valve case. Said member is provided with a seat for an emergency valve, which have has a stem which extends into the bore of the hollow piston stem. The emergency valve is also provided with a downwardly extending stem which is guided in a bore of the emergency check valve.

Occasionally, due to improper or careless handling by a workman in disassembling the check valve case from the triple valve body, the stems of the emergency valve may become bent, so that when the parts are again assembled, the emergency piston and the emergency valve may be thrown out of alinement, so that the piston may bind and stick in the bushing and the emergency valve may fail to seat properly.

The principal object of my invention is to provide an emergency valve mechanism of the above character in which binding and sticking of the emergency piston will be prevented and the proper seating of the emergency valve will be assured.

Figure 1:
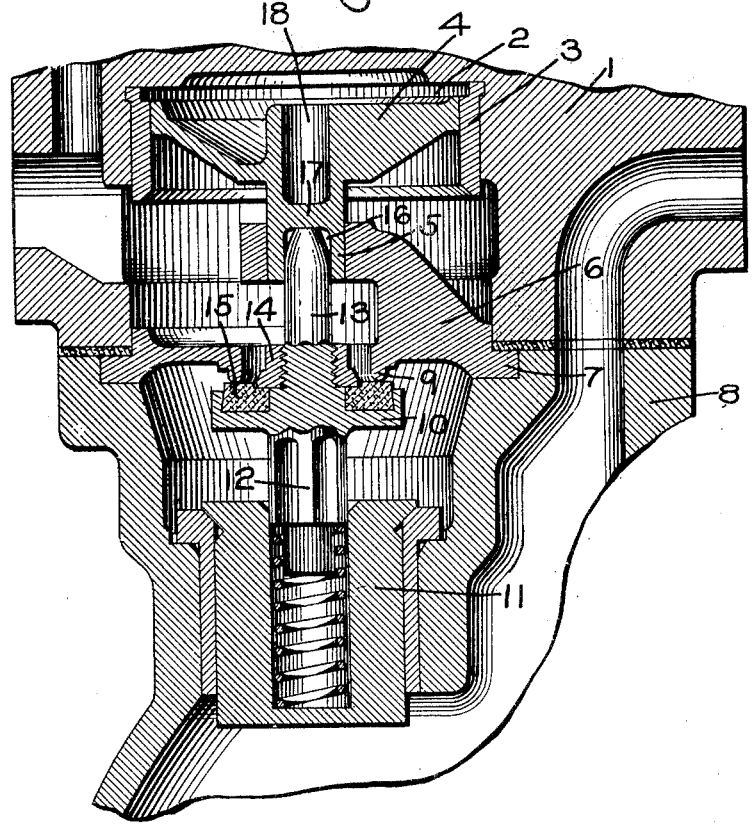

In the accompanying drawings; Figure 1 is a sectional view of the emergency valve portion of a triple valve device, showing my improvement embodied therein; and Fig. 2 a fragmentary sectional view, showing the application of my invention to a standard emergency piston.

The construction shown in Fig. 1 comprises a triple valve body section 1 having a chamber 2 in which is mounted a bushing 3. An emergency piston 4 is mounted to reciprocate in said bushing and is provided with a stem 5 which is guided in a bore of a guide member 6.

The guide member 6 is provided with a flange 7 which is clamped between the valve body 1 and an emergency check valve casing 8, the guide member 6 being provided with a seat rib 9 adapted to be engaged by an emergency valve 10. Mounted in casing 8 in alinement with the valve 10 is an emergency check valve 11 having a bore into which a guide stem 12 of the emergency valve 10 extends.

The emergency valve 10 is provided with an upwardly extending guide stem 13, the lower portion of which is threaded for a nut 14, which is adapted to clamp the resilient seat 15 of the emergency valve in place.

According to my invention, the guide stem 13 is made relatively short, so that it extends into a shallow bore 16 of the emergency piston 4 and engages a partition wall 17. Above the partition wall 17, the emergency piston may be provided with a cored chamber 18, to reduce the weight of the piston.

The stem 13 extends into the piston 4 sufficiently to serve the purpose of maintaining the stems 5 and 13 in alinement, but the bore 16 being shallow, the shortness of the portion of the stem 13 which extends into the bore 16 prevents any possibility of the stem being bent, when the check valve case is removed from the triple valve body.

Figure 2:
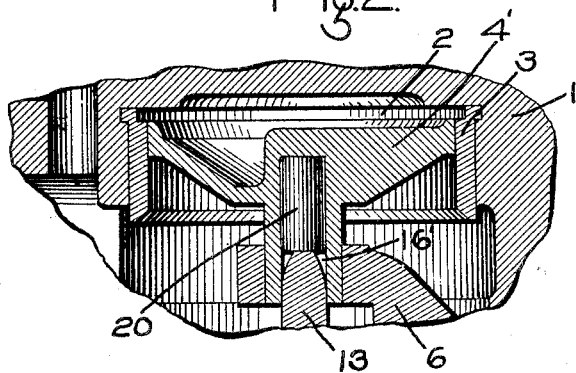

In the above described construction, the emergency piston 4 is designed specially for use in connection with my improvement, but as shown in Fig. 2, the improvement may also be employed with a standard emergency piston 4', in which the axial bore 16' extends nearly to the upper face of the piston. In the case of a standard piston as shown, a metal plug 20, preferably of steel is driven into the bore 16', the plug having its end face in the same relation to the stem 13, as is the lower face of the partition wall 17 in the construction shown in Fig. 1.

Having now described my invention, what I claim is new and desire to secure by Letters Patent, is:

1. In an emergency valve mechanism for a triple valve device, the combination with an emergency piston having a stem provided with a bore of shallow depth, of an emergency valve having a stem extending into said bore, the major portion of the stem section extending into said bore being of less diameter than the bore, to permit rocking movement of the valve stem relative to the piston stem without tending to bend the valve stem.

2. In an emergency valve mechanism for a triple valve device, the combination with an emergency piston having a stem provided with a bore of shallow depth, of an emergency valve having a relatively short stem extending into said bore, the major portion of the stem section extending into said bore being of less diameter than the bore, to permit rocking movement of the valve stem relative to the piston stem without tending to bend the valve stem.

3. In an emergency valve mechanism for a triple valve device, the combination with an emergency piston having a stem having an axial bore with a partition wall dividing the bore into two portions, one of shallow depth, of an emergency valve having a stem extending into said bore portion of shallow depth and constantly engaging said wall, the major portion of the stem section extending into said bore being of less diameter than the bore, to permit rocking movement of the valve stem relative to the piston stem without tending to bend the valve stem.

In testimony whereof I have hereunto set my hand, this 3rd day of December, 1929.

CLYDE C. FARMER.